(No Model.)  2 Sheets—Sheet 1.

F. BODEN.
BAND CUTTER AND FEEDER.

No. 417,976. Patented Dec. 24, 1889.

Witnesses  
John Imirie  
E. L. Siggins

Inventor  
Frank Boden

By his Attorneys,  
C. A. Snow & Co.

(No Model.) 2 Sheets—Sheet 2.
F. BODEN.
BAND CUTTER AND FEEDER.
No. 417,976. Patented Dec. 24, 1889.
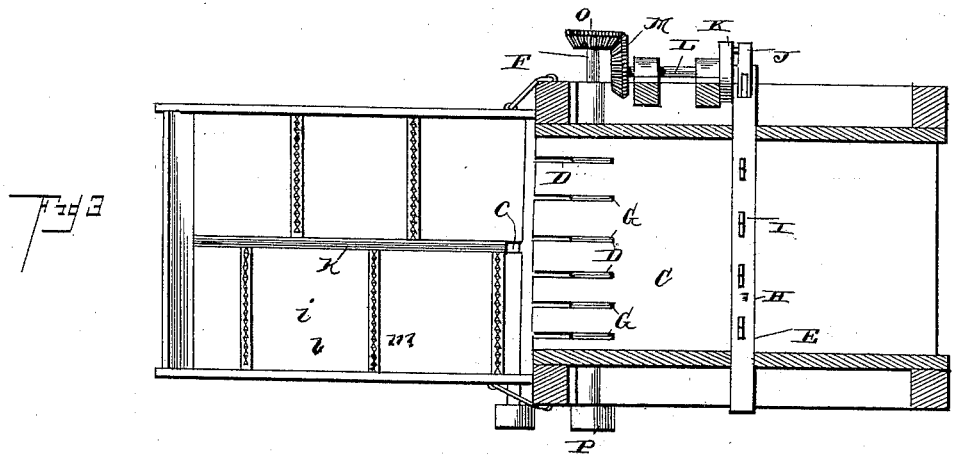
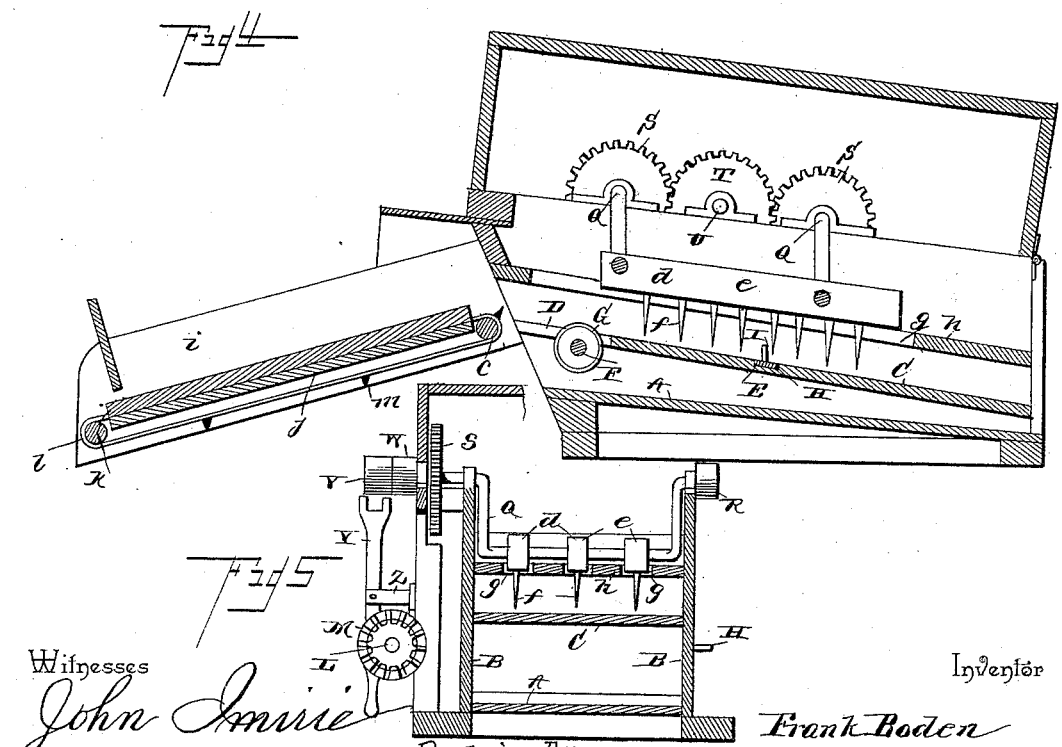
Witnesses
John Imirie
By his Attorneys,
Inventor
Frank Boden

UNITED STATES PATENT OFFICE.

FRANK BODEN, OF MASON CITY, NEBRASKA.

BAND-CUTTER AND FEEDER.

SPECIFICATION forming part of Letters Patent No. 417,976, dated December 24, 1889.

Application filed August 29, 1889. Serial No. 322,285. (No model.)

*To all whom it may concern:*

Be it known that I, FRANK BODEN, a citizen of the United States, residing at Mason City, in the county of Custer and State of Nebraska, have invented a new and useful Band-Cutter and Feeder, of which the following is a specification.

My invention relates to improvements in band-cutters and feeders; and it consists in certain novel features hereinafter described and claimed.

Figure 1:
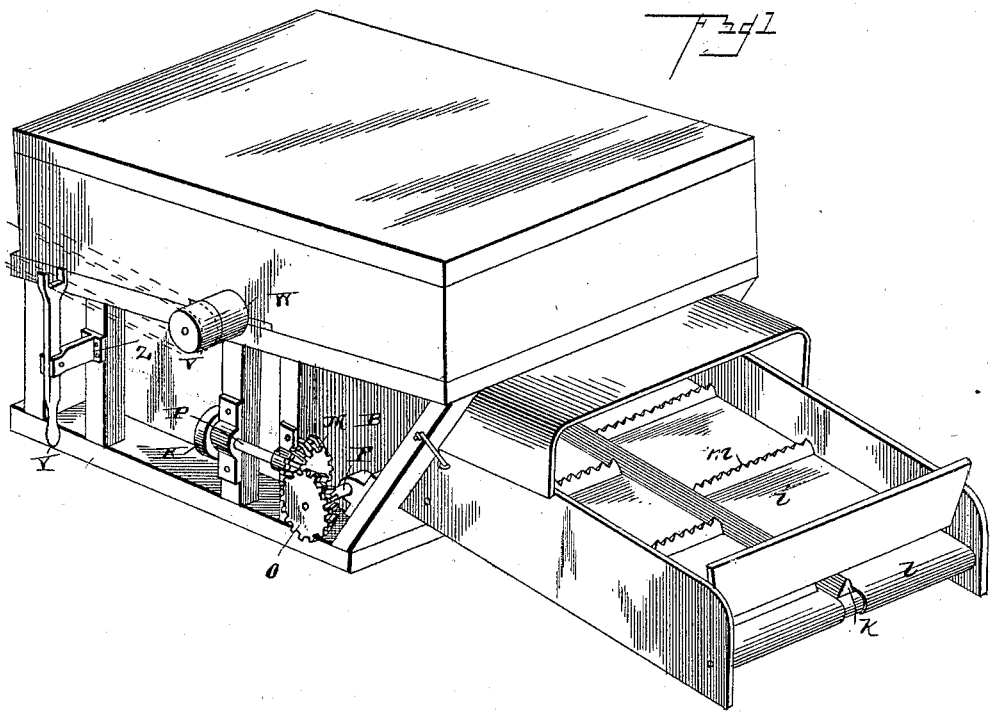
Figure 2:
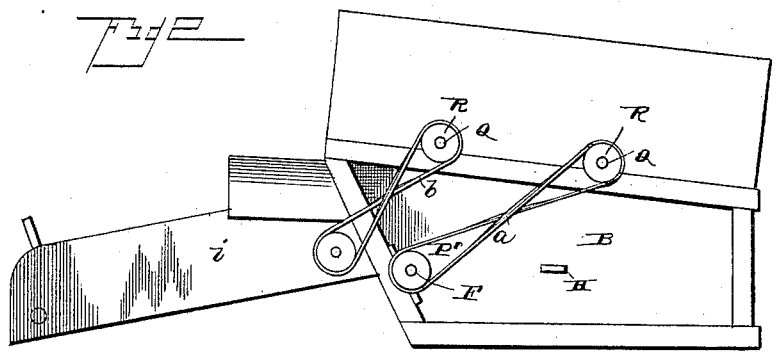

In the accompanying drawings, Figure 1 is a perspective view of my improved device. Fig. 2 is a side view of the same. Fig. 3 is a horizontal section on the line $x$ $x$ of Fig. 2. Fig. 4 is a longitudinal vertical section. Fig. 5 is a transverse section.

In carrying out my invention I employ a frame consisting of a bottom A, and the sides B rising therefrom, and within the frame above the bottom A, I secure the horizontal board or plate C, provided near its front end with a series of longitudinal grooves D, and near its center this board or plate C is provided with a transverse groove E, as shown. On the sides of the frame, near the front end of the same, I journal the shaft F, which extends transversely through the frame, and a series of rotary cutters G are secured rigidly to the said shaft and project upward through the slots E of the board or plate C. Within the transverse groove E, I arrange a bar H, having a series of fingers or lugs I on its upper side, and having its outer end connected by a link J with a crank-disk K on the end of a longitudinally-disposed shaft L, mounted in suitable bearings on the side of the frame and having a gear-wheel M at its front end meshing with a gear-wheel O on the end of the transverse cutter-shaft F. The opposite end of the transverse cutter-shaft is provided with a pulley P, through which the said shaft is set in motion, as will be hereinafter more fully referred to.

On the upper side of the frame I journal the crank-shafts Q, which have band-pulleys R at one end and the gear-wheels S at their opposite ends, as clearly shown. These wheels S mesh with a common gear-wheel T, secured on a shaft U, journaled on the upper side of the frame. On the outer end of this shaft U, I provide the fast and loose pulleys V W, and the driving-belt (shown in dotted lines in Fig. 1) extends from the thrashing-machine around one of said pulleys, and the said belt is shifted from one pulley to the other by means of a lever Y, engaging the belt and fulcrumed on a bracket Z, projecting from the side of the frame. The said crank-shafts are simultaneously rotated by means of the gear-wheels shown and just described, and the pulley R on the end of the rear crank-shaft is connected by a belt $a$ with the pulley P on the end of the cutter-shaft. The pulley on the end of the front crank-shaft is connected by a belt $b$ with the extended shaft of the lower roller $c$ of the bundle-carrying apron.

The rakes or feeders $d$ are mounted on the crank-shafts, and consist of the longitudinally-disposed bars $e$ and the teeth $f$, depending from the said bars. These bars are caused to vibrate by the crank-shafts as they are rotated, and they will be thereby carried downward, so that the teeth will engage in the grain and feed it into the thrashing-machine. These feeders play in longitudinal slots $g$ in the plate $h$, which is secured within the frame above the plate or board C, and the grain is thereby prevented from being carried upward with the feeders so as to clog the same.

To the front end of the frame I secure the bundle-carrier $i$, which consists of suitable side plates and a bottom plate $j$, connecting the same, the said bottom plate being provided with a longitudinal rib K on its upper side, as clearly shown, and in the ends of the side bars I journal the rollers $k$, around which the endless belts or aprons $l$ are passed. These belts or aprons are provided on their upper sides with transverse ribs or cleats $m$, which are adapted to engage the bundles placed thereon, so that when the belt $i$ is moved the bundles will be carried forward and fed into the thrashing-machine.

The cutter-shaft and crank-shafts and the bundle-carrying belts or aprons are driven from the thrashing-machine by the gearing shown and described, and the bundles are placed on the bundle-carrier and thereby conveyed to the cutters. The bundles are discharged by the carrier onto the board or plate C, and as they pass over the said board the band will be severed by the cutters G, thereby loosening the grain composing the bundle. The transverse agitating-bar is at the same time reciprocated, so as to thoroughly shatter the bundle, so that the grain will be fed into the thrashing-machine evenly and regularly.

From the foregoing description, taken in connection with the accompanying drawings, it will be seen that I have provided a band-cutter and feeder which is simple in its construction and efficient in its operation. The bundles are conveyed to the thrashing-machine easily and rapidly and the bands effectually severed. The several parts are compactly arranged, so that the device occupies the least possible room. The several parts are all driven from a common source, so as to be simultaneously operated, and the grain is spread so as to be fed into the thrashing-machine very easily by the transverse agitating-bar, as will be very readily understood.

Having thus described my invention, what I claim, and desire to secure by Letters Patent, is—

1. The combination, with the frame, of the plate C, secured within the same and provided at its front end with a series of longitudinal slots and having a transverse groove in rear of said slots, the transverse cutter-shaft, the cutters on said shaft projecting through the slots in the said plate, the agitating-bar mounted in the transverse groove of said plate, and mechanism for operating the said bar and the cutters, as set forth.

2. The combination of the frame, the plate C therein, the rotary cutters arranged at the front end of the plate C, the reciprocating bar mounted transversely on the said plate in rear of the cutters, the crank-shafts mounted in the frame above the plate C, the rakes hung on said crank-shafts, and mechanism for simultaneously operating the crank-shafts, the cutters, and the reciprocating bar, as set forth.

3. The combination of the frame, the transverse shaft in the front end of the frame, the cutters secured on said shaft, the transverse bar mounted on the upper side of the plate C and provided with upwardly-projecting lugs on its upper side, mechanism for operating the transverse bar and the cutters, the crank-shafts mounted transversely on the frame and provided with gear-wheels S at their ends, the rakes hung on said shafts, the gear-wheel T, meshing with both gear-wheels S and secured on a shaft which is mounted transversely on the frame, and mechanism for rotating said shaft, as specified.

In testimony that I claim the foregoing as my own I have hereto affixed my signature in presence of two witnesses.

FRANK BODEN.

Witnesses:
G. W. RUNYON,
J. G. LEMON.